United States Patent Office 3,523,204
Patented Aug. 4, 1970

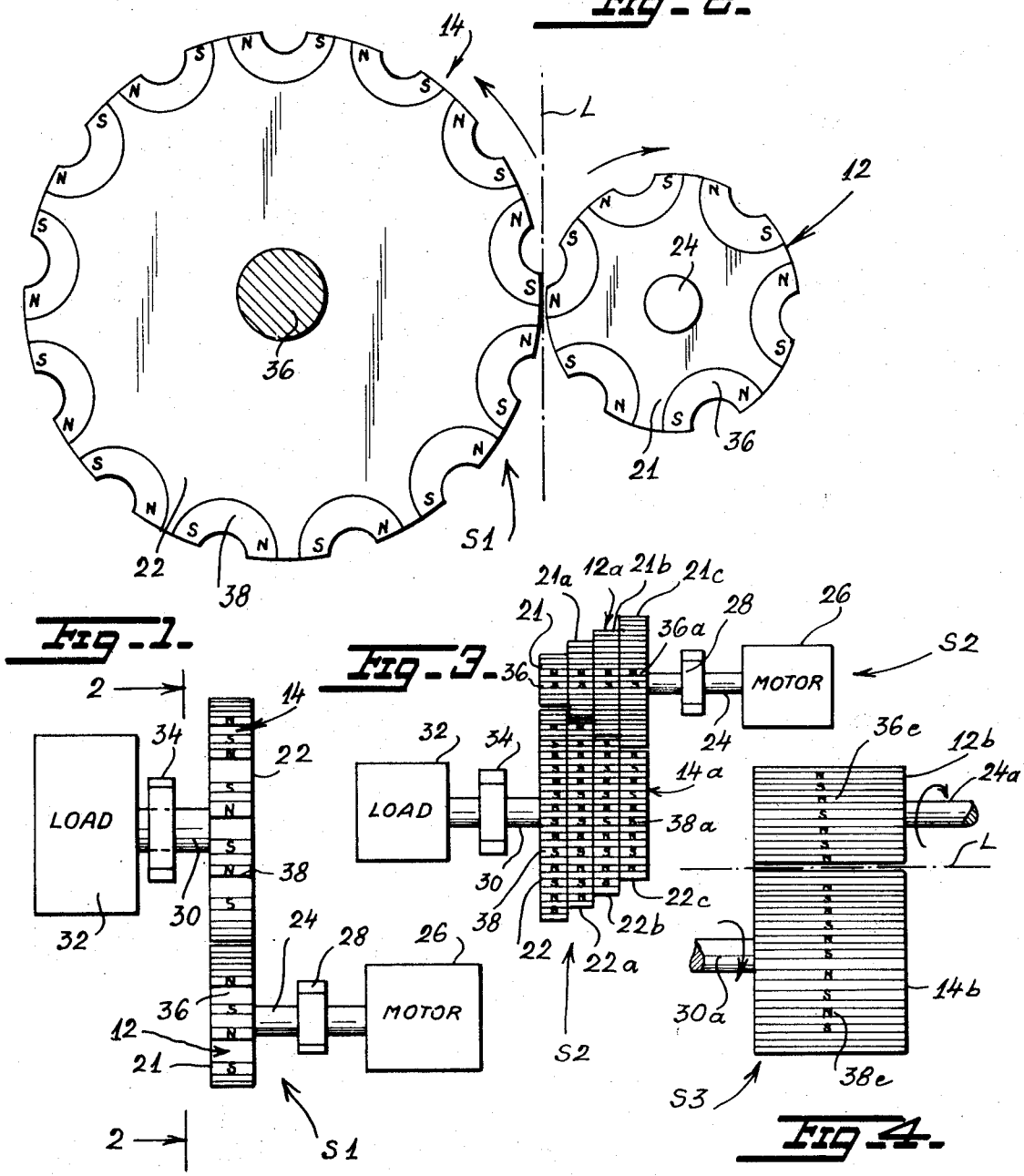

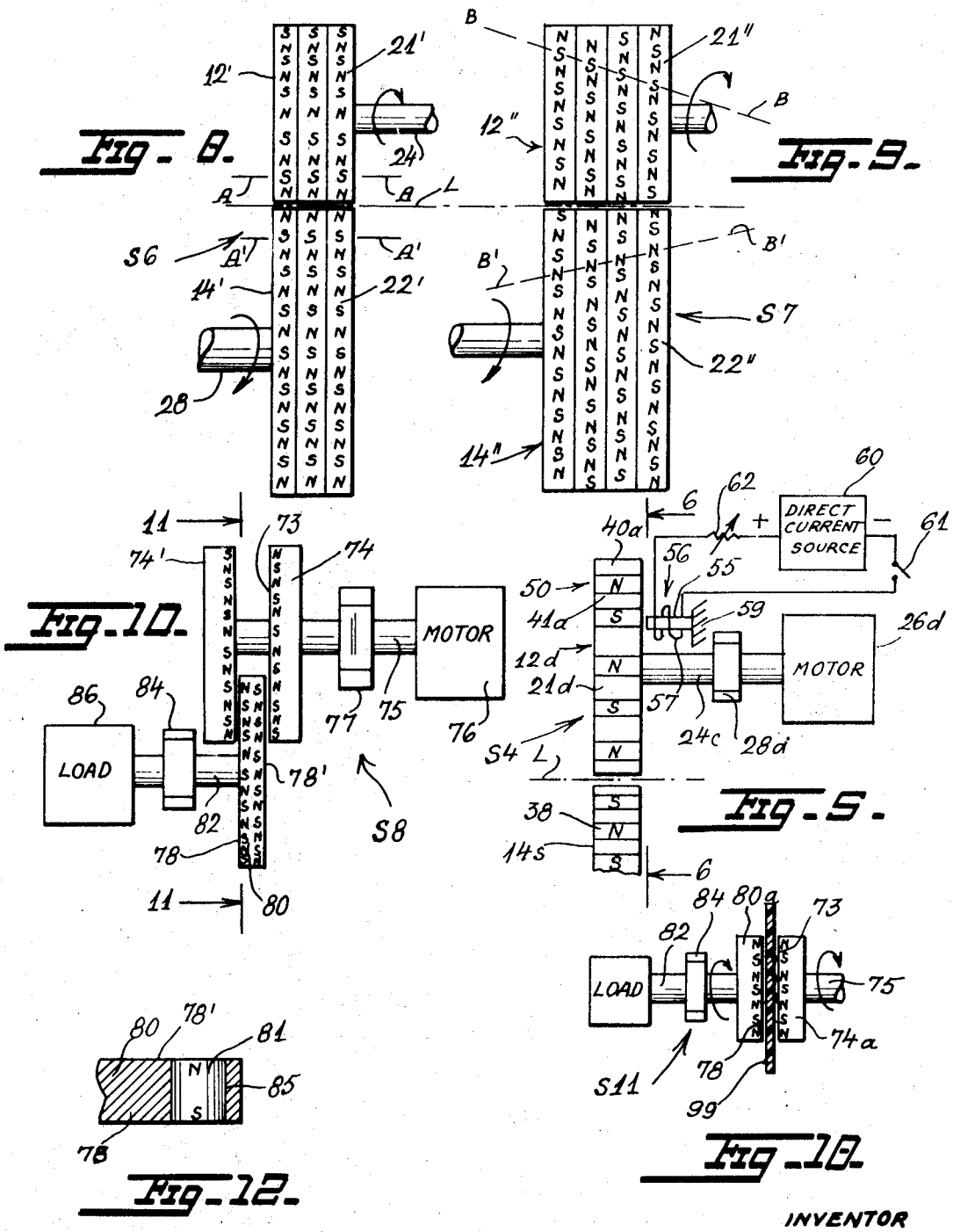

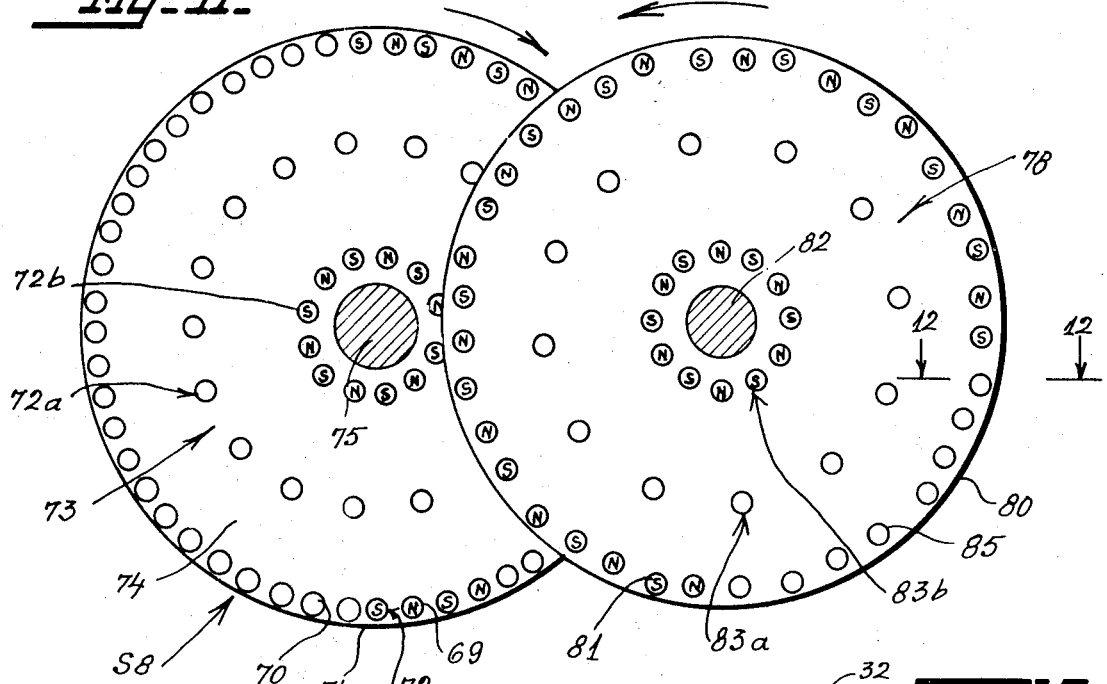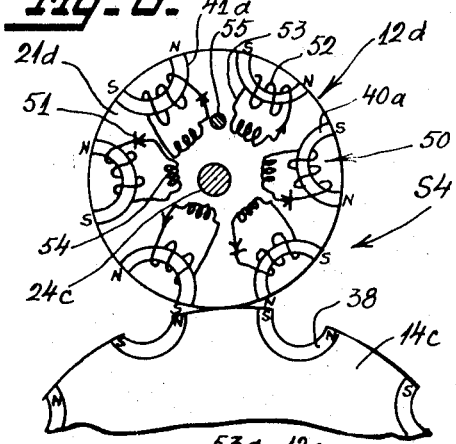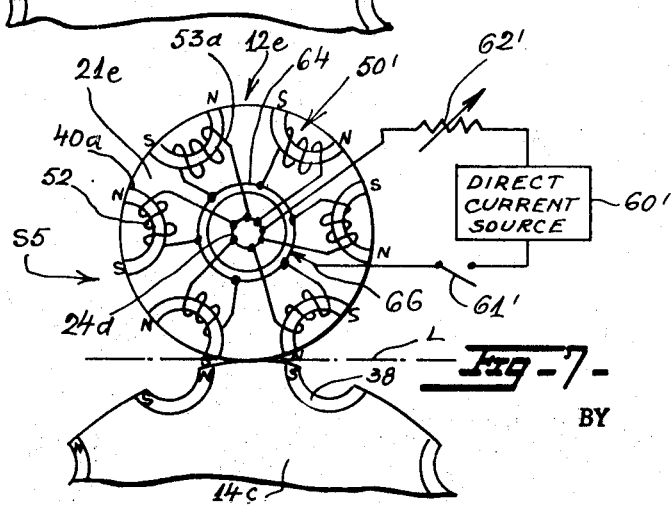

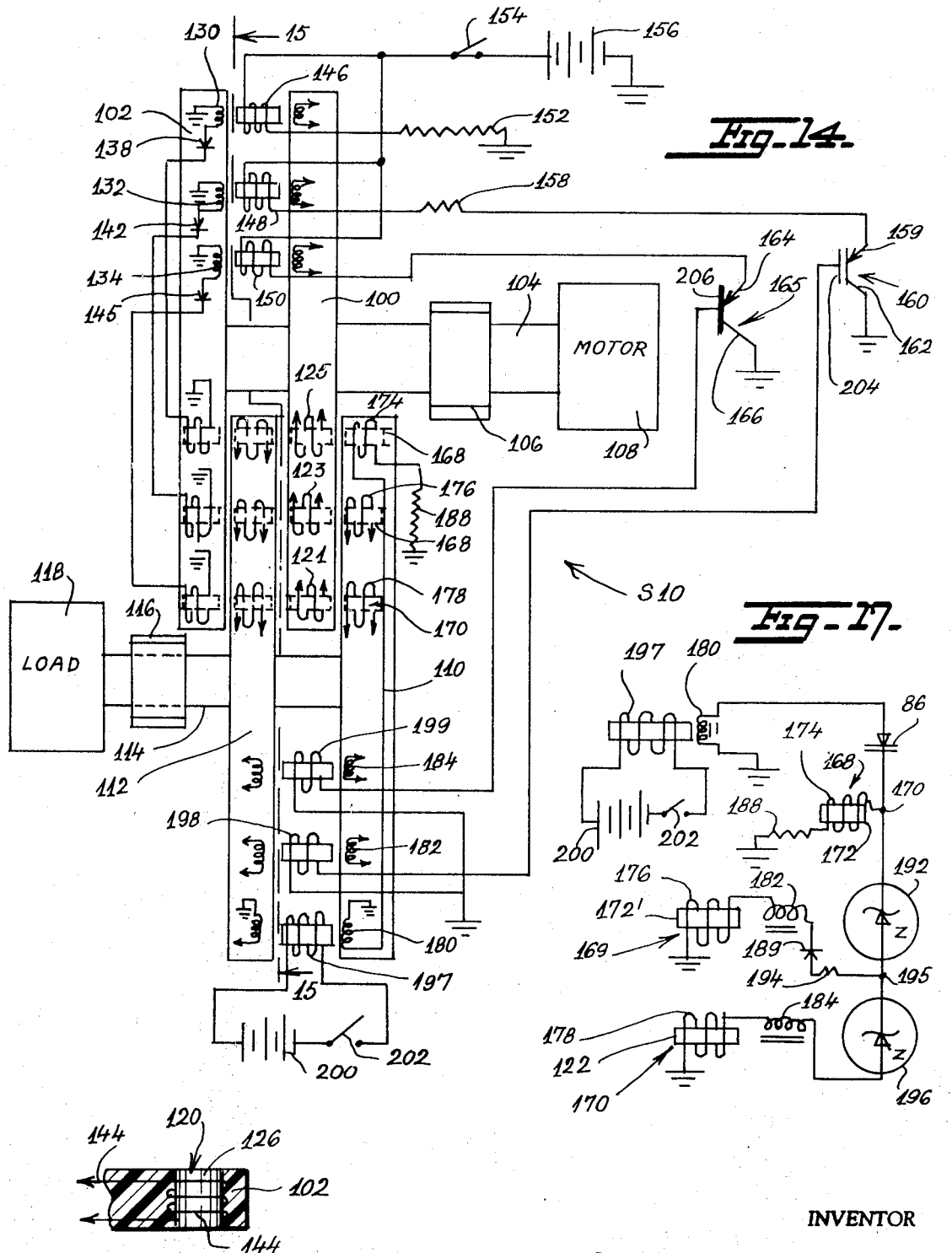

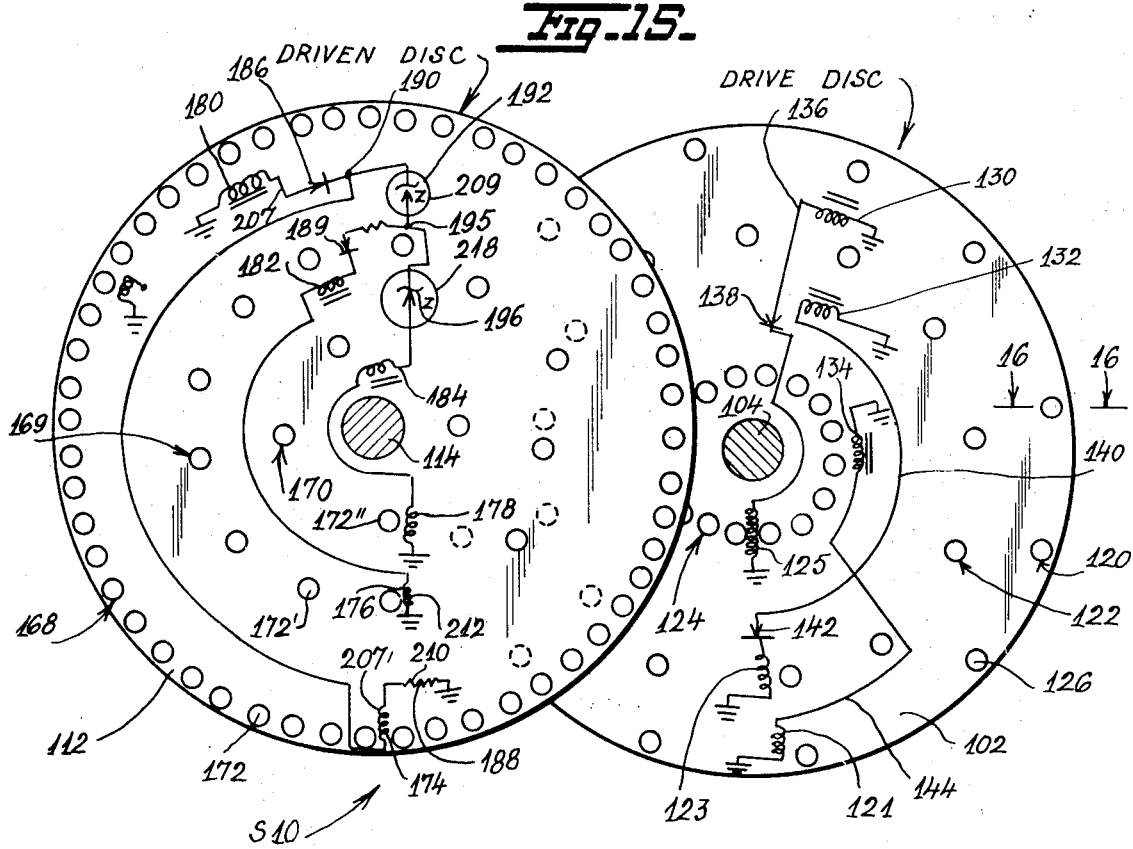
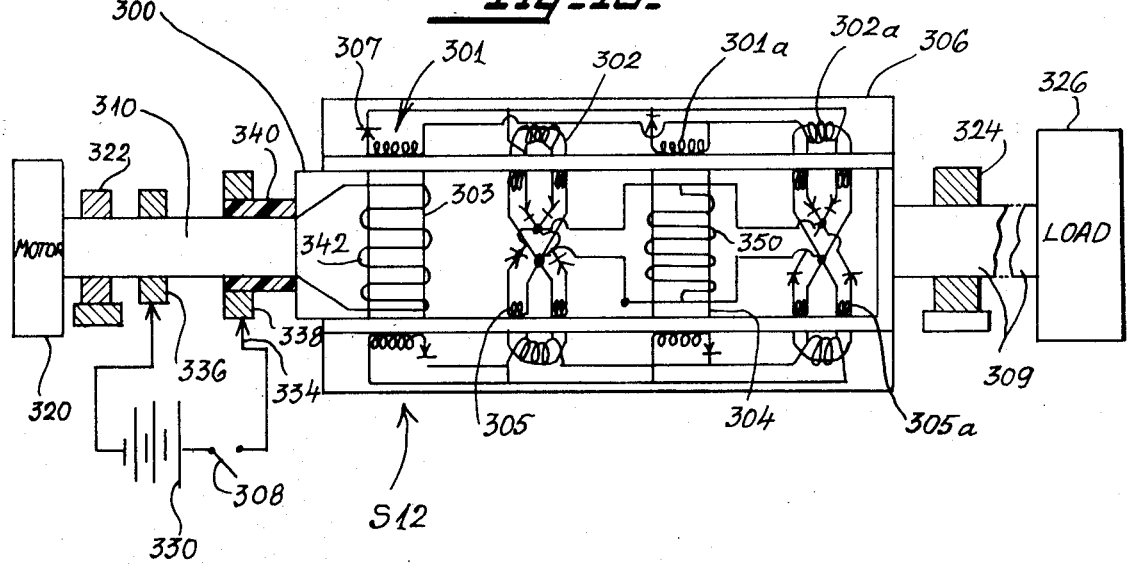

3,523,204
MAGNETIC TRANSMISSION SYSTEM
Sydney Rand, G.P.O. Box 2034, San Juan,
Puerto Rico 00936
Filed Jan. 19, 1968, Ser. No. 703,840
Int. Cl. H02k 49/06
U.S. Cl. 310—94                                3 Claims

ABSTRACT OF THE DISCLOSURE

The disclosure describes a frictionless, noiseless, transmission system in which a rotatable drive member carrying circumferentially spaced magnets magnetically drives a rotatable driven member also carrying circumferentially spaced magnets. The magnets are permanently magnetized elements or are electromagnets. The drive and driven members have such dimensions and the magnets are so distributed that any desired mechanical advantage is obtained.

---

The invention concerns a magnetic transmission system. Accordingly, the invention involves a frictionless, noiseless, transmission system wherein magnetic flux replaces gear teeth used in conventional transmissions, and wherein any desired mechanical advantage or transmission ratio can be obtained.

In its basic form, permanent magnets or electromagnets are mounted in circumferentially spaced disposition in two discs. The discs are peripherally adjacent to each other. When one disc is turned, the other disc turns with it. The polarity of magnets is alternated and the number, relative size and spacing of the magnets is dependent on the mechanical advantage desired. The discs can be arranged in partial overlapping face-to-face position. A plurality of discs can be juxtaposed axially of each other in the drive and driven members to provide greater driving torque. The magnets can be elongated elements secured in cylindrical drive and driven members.

Driving torque and transmission ratios can be changed by controlling activation of electromagnets carried by the discs. To avoid heating caused by hysteresis, solid state diodes can be incorporated in the circuits of the electromagnets to prevent alternation of polarity. Coils can be incorporated in the same discs which on cutting the magnet field provide current to activate the electromagnets as required. To provide smoother, more continuous driving torque, the magnets can be offset from each other radially or axially of the driving and driven member. The drive and driven members can be concentrically disposed cylinders with one member a hollow cylinder in which the other is axially inserted. Coils of one member correspond with electromagnets of the other. Diodes in the electrical circuit of the electromagnets maintain unidirectional polarity preventing hysteresis heating. The two cylinders can be movable axially of each other for increasing or decreasing slippage.

In a further application, the drive and driven members can be separated by a metallic or plastic wall or sheet so that the two members are out of direct mechanical contact while driving torque is maintained magnetically between the two members. In addition, automatic changing of torque without loss of power can be accomplished as required by using electromagnets in different diameter concentric circles in partially overlapping discs in face-to-face position. The interacting electromagnets of the drive and driven discs in the different circles provide the equivalent of varying gear ratios, since the magnetic fields act as gear teeth would. By activating and deactivating the electromagnet circles in accordance with speed of revolution of drive and driven members, torque is increased or decreased as required without power loss. Zener diodes can be used in the circuits charging the electromagnets for automatic switching and regular, solid state diodes can be used to prevent hysteresis heating.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIG. 1 is a plan view partially diagrammatic in form of a first magnetic transmission system embodying the invention.

FIG. 2 is an enlarged cross sectional view taken on line 2—2 of FIG. 1.

FIGS. 3 and 4 are plan views partially diagrammatic in form of second and third magnetic transmission systems embodying the invention.

FIG. 5 is a diagram of a fourth system employing electromagnets, according to the invention.

FIG. 6 is a diagrammatic sectional view taken on line 6—6 of FIG. 5.

FIG. 7 is a diagrammatic view similar to FIG. 6 showing a fifth magnetic transmission system.

FIGS. 8, 9 and 10 are diagrammatic plan views of sixth, seventh and eighth magnetic transmission systems respectively.

FIG. 11 is an enlarged vertical sectional view partially diagrammatic in form taken on line 11—11 of FIG. 10.

FIG. 12 is a further enlarged sectional view taken on line 12—12 of FIG. 1.

FIG. 13 and FIG. 14 are diagrammatic plan views of ninth and tenth magnetic transmissions systems respectively.

FIG. 15 is an enlarged vertical diagrammatic sectional view taken on line 15—15 of FIG. 14.

FIG. 16 is a further enlarged fragmentary sectional view taken on line 16—16 of FIG. 15.

FIG. 17 is a diagram of a magnetizing circuit employed in the system of FIGS. 14–16.

FIG. 18 is a diagrammatic plan view partially in section of an eleventh magnetic transmission system.

FIG. 19 is a diagrammatic sectional view of a twelfth magnetic transmission system arranged to operate as a magnetic clutch.

Referring first to FIGS. 1 and 2, there is shown a transmission system S1 including a drive member 12 and driven member 14 formed as discs 21, 22. Disc 21 is carried by drive shaft 24 of motor 26. The shaft is journalled in a bearing 28. Disc 22 is coupled by a shaft 30 to a driven load 32 of any suitable type. Shaft 30 is journalled in bearing 34. The two discs are axially parallel and peripherally closely adjacent and tangent to each other. Disc 21 has a plurality of arcuate bar magnets 36 secured in circumferentially spaced positions around the periphery of the disc. N and S poles alternate in position around the disc. Disc 22 has a plurality of arcuate bar magnets 38 secured in circumferentially spaced positions around the periphery of the disc. N and S poles alternate around the disc. The magnets 36 are equally spaced apart. Magnets 38 are also equally spaced part. The liner spacing of magnets 36 and magnets 38 is equal.

When the motor 26 which can be an electric motor or other prime power mover is driving shaft 24, disc 21 rotates with it. The N and S poles of magnets 36 carried by disc 21 successively attract S and N poles respectively of magnets 38 carried by disc 21 so that the two discs rotate together. Thus rotatable load 32 is driven via the transmission system including the two magnetically coupled discs. It will be apparent that there is no direct mechanical contact between the discs so that there is no mechanical friction between them and none of the noise which generally attends meshed teeth of coupled mechanical gears. Since, as shown in FIG. 2, the drive disc 21 has six circumferential magnets 36 while driven disc 14 has thirteen magnets 38, the mechanical advantage derived in system S1 will be in the ratio of 13:6.

FIG. 3 shows system S2 in which drive member 12a has a plurality of discs 21, 21a, 21b and 21c of successively different diameter mounted in shaft 24. These discs are respectively coupled to discs 22, 22a, 22c and 22d of member 14a. The torque is distributed more uniformly between the drive and driven members than is possible with single coupled discs in a system S1. Other parts of system S2 corresponding to those of system S1 are correspondingly numbered. Each disc of member 12a has N and S poles of peripheral magnets 36 and 36a "meshed" with S and N poles of peripherally disposed magnets 38, 38a of the discs in member 14a.

System S3 of FIG. 4 employs two cylindrical members 12b, 14b. Drive member 12b has arcuate bar magnets 36e which are extended the full length of the cylinder and circumferentially spaced apart like magnets 36 of drive member 12 in system S1. Driven member 14b has arcuate bar magnets 38e also extended the full length of the cylinder and circumferentially spaced apart like arcuate magnets 38 of system S1. Drive member 12b is carried by drive shaft 24a and driven member 14b is carried by driven shaft 30a. The N and S poles of the magnets of the drive member 12b couple with the S and N poles respectively of the driven member 14b. The long cylinders provide greater driving torque than is possible with axially short discs such as employed in system S1.

System S4 of FIGS. 5 and 6 employs disc shaped driven member 14c with arcuate magnets 38 as in system S1. The disc shaped drive member 12d of system S4 has peripherally disposed arcuate electromagnets 50. Each electromagnet consists of a magnetizable core 40a in a recess 41a. Part of the core is surrounded by a coil 52, which is connected by wires 53 through a diode 51, to another coil 54 radially spaced inwardly of core 52 in a closed circuit. The coils 54 are disposed in a circle so that they can be cut magnetic lines of force maintained by core 55 of a stationary electromagnet 56 carried by suport 59. This electromagnet is spaced radially from drive shaft 24c of the disc 21d of drive member 12d. The shaft is driven by motor 26d and is journalled in bearing 28d. Wound on core 55 is a coil 57 connected to a direct current source 60. This can be a battery, a rectifier, of alternating current, a direct current generator or other suitable D-C source. A switch 61 permits the current to be turned off and on. A variable resistor 62 regulates the current output of the direct current source 60.

In system S4, when switch 61 is closed, electromagnet 56 maintains a magnetic field which induces a voltage in each of coils 54 in turn. The resulting current flowing through coils 52 magnetizes the cores 42a with alternate N and S polarity. The driving member 12d is magnetically coupled to arcuate magnets 38 of driven member 14c which also have alternate N and S poles. This system has the advantage that the magnetizing current provided by source 60 can be turned on or off and can be regulated in intensity. Thus the driving torque, exerted on driven member 14c can be regulated from off to full on.

System S5 of FIG. 7 is generally similar to system S4 and corresponding parts are identically numbered. In this magnetic transmission system, the coils 52 on cores 40a of electromagnets 50' are located circumferentially around the disc 21e of drive member 12e and are connected by wires 53a between shaft 24d and a slip ring 64 carried by and insulated from shaft 24d. The slip ring is wiped by a wiping contact 66 connected to direct current source 60' via switch 61'. The shaft 24d is connected to the other terminal of the current source 60' via variable resistor 62'. It is possible and may be preferable to make the discs of plastic or other nonmagnetic and nonconductive material to minimize eddy currents and hysteresis losses. The arrangement of system S6 may be preferred since the structure of the driving member is somewhat simplided over that of system S5, by the elimination of the diodes 51 and coils 54.

FIG. 8 shows magnetic transmission system S6 in which drive member 12' has a plurality of discs 21' of equal size. The discs are mounted on drive shaft 24 as in system S1 of FIGS. 1 and 2. The magnetic poles N and S in the adjacent discs are aligned axially of the assembly on line A—A. Associated driven member 14' has a plurality of corresponding discs 22' in which poles N and S are aligned axially of the assembly, on line A'—A'. This system is otherwise the same as system S1 and corresponding parts are identically numbered. The multiple disc assemblies for the drive and driven member provide greater driving torque than is possible with a single drive disc and single driven disc.

FIG. 9 shows magnetic transmission system S7 which is generally similar to system S6 and corresponding parts are identically numbered. In system S7, the N and S poles in discs 21" and 22" are staggered with respect to those in adjacent discs. There are aligned skewed lines B—B and B'—B' in the two drive members 12" and 14". This arrangement provides smoother coupling and is analogous to meshed helical gears, with none of the disadvantages of friction losses, wear, noise, etc., encountered with mechanical gears.

FIGS. 10, 11 and 12 show another magnetic transmission system S8 in which magnets 70 are disposed in a plurality of concentric rings 72, 72a, 72b around the face 73 of spaced drive discs 74, 74' and are set in holes 69. The discs are mounted on a shaft 75 driven by motor 76. The shaft is journalled in bearing 77. The faces 73 of the discs overlap faces 78, 78' of driven disc 80 disposed between discs 74, 74'. Disc 80 is mounted on driven shaft 82 carried by bearing 84 and connected to driven load 86. Disc 80 has bar magnets 81 disposed in a plurality of concentric rings 83, 83a, 83b and located in holes 85. The face-to-face disposition of the discs provides a smoother drive than is possible where the magnets are located in the periphery of the disc. Also greater torque is possible due to disposition of the magnets in a plurality of rings. Rings 72, 72a, 72b and rings 83, 83a, 83b have respectively equal diameters, but they could have different diameters depending on the mechanical advantage desired in driving torque. The speed and torque ratio will depend on the relative diameters of the discs 74, 74' and 80, and on the amount of overlap of the discs.

System S9 shown in FIG. 13 is arranged somewhat like system S1 of FIGS. 1 and 2 in that it has disc shaped drive member 12 mounted on drive shaft 24 journaled in bearing 28 and driven by motor 26. The system also has two idler assemblies 90a and 90b comprising discs 91a, 91b disposed axially parallel to disc 21 of assembly 12, but in diametrically opposite positions. Discs 91a, 91b are carried on shafts 92 journaled in bearings 93. Magnets 36 carried by disc 21 are magnetically coupled to magnets 94a, 94b carried by discs 91a, 91b. Discs 91a and 91b are equal in diameter but larger than disc 21. At the other ends of shafts 92 are smaller idler discs 95a, 95b carrying peripheral magnets 96 magnetically coupled to magnets 38 carried by large disc 22f of driven disc assembly 14f. Disc 22f is carried by shaft 30 coupled to load 32 and journaled in bearing 34. By the arrangement described, the speed and torque ratio between the drive disc 21 and driven disc 22f can be made very much larger than is possible with direct coupling of the discs as in system S1. Also greater magnetic coupling force is available. System S9 illustrates the principle of a magnetic idler coupling and drive arrangement between magnetic drive and driven members.

System S10 illustrated in FIGS. 14–17 provides for automatic driving torque changes where mechanical advantage and torque applied to the load are changed due to variable load requirements. Driving torque changes are made automatically as speed of revolution of the driven members changes. In system S10 as shown there are two axially spaced drive discs 100 and 102 carried by shaft 104 journaled in bearing 106 and driven by motor 108. Alternately overlapped with discs 100 and 102 are two driven discs 110, 112 carried by shaft 114 journaled in bearing 116 and driving load 118.

Each of the drive discs has three concentric rings of equally spaced electromagnets 120, 122 and 124 each including a core 126 extending axially of the disc; see FIG. 16. The cores are surrounded by coils 121, 123 and 125 in the respective rings, only one of each of these coils being shown in FIGS. 14 and 15. The discs 100, 102 also carry three rings of equally spaced magnetic induction coils 130, 132 and 134. Only one of each coil is shown in FIGS. 14 and 15. The outermost coils 130 are connected to the innermost coils 125 respectively via wires 136 in series with a diode rectifier 138. The intermediate or inner coils 132 are connected to inner electromagnet coils 123 respectively via wires 140 in series with rectifier 142. The innermost coils 134 are connected to the outermost coils 121 respectively via wires 144 and rectifier 145.

Three stationary induction coils 146, 148 and 150 are disposed between discs 100, 102 in radially spaced positions for cooperation with coils 130, 132 and 134 respectively; see FIG. 14. Outermost coil 146 is connected at one end to ground via a resistor 152. The other end of the coil is connected via switch 154 to battery 156 which goes to ground. Inner coil 148 is connected at one end via a resistor 158 of lower resistance than resistor 152 to emitter 159 of transistor 160. The collector 162 of this transistor is connected to ground. The other end of coil 148 is connected to the battery via switch 154. One end of innermost coil 150 is connected to emitter 164 of transistor 165. The collector 166 of this transistor is connected to ground. The other end of coil 150 is connected to the battery 156 via switch 154.

In the driven discs 110 and 112 are three concentric rings of equally spaced electromagnets 168, 169 and 170. These electromagnets are spaced apart radially equal to the radial spacing of electromagnets 120, 122 and 124 in discs 100, 102 so that outermost electromagnets 168 intersect innermost electromagnets 124, inner electromagnets 169 intersect inner electromagnets 122 and innermost electromagnets 170 intersect outermost electromagnets 120. Each of the electromagnets 168, 169 and 170 has a core 172, 172' or 172" on which is wound a coil 174, 176 or 178; see FIGS. 14, 15 and 17. The circuit of the electromagnets in discs 110, 112 is shown best in FIGS. 15 and 17. Only one coil of each electromagnet is shown in each driven disc.

Three concentric rings of induction coils 180, 182 and 184 are provided in each of discs 110, 112. Only one coil of each ring is indicated in FIGS. 14, 15 and 17. Each outermost coil 180 is connected at one end to ground and at the other end is connected via a diode rectifier 186 to one end of an outermost electromagnet coil 174. The other end of coil 174 is connected via a resistor 188 to ground. Junction point 190 between diode 186 and coil 174 is connected to Zener diode 192. This diode is normally in nonconductive state until its breakover voltage is reached when it becomes conductive. The Zener diode is connected via a resistor 194 of smaller resistance than resistor 188 and diode rectifier 189 to one end of an inner coil 182. This coil is connected to one end of an inner electromagnet coil 176 which in turn is connected to ground. Junction point 195 of resistor 194 and Zener diode 192 is connected to another Zener diode 196 whose breakover voltage is higher than that of Zener diode 192. Zener diode 196 is connected to one of innermost induction coils 184 which in turn is connected to one of innermost electromagnet coils 178. Coil 178 in turn is connected to ground.

Located between discs 110 and 112 in radially spaced disposition for cooperation with coils 180, 182, and 184 respectively are three stationary induction coils 197, 198 and 199. Outermost coil 197 is connected in series with a battery 200 and a switch 202. Inner coil 198 is connected at one end to ground and at the other end to base 204 of transistor 160. Innermost coil 199 is connected at one end to ground and at the other end to base 206 of transistor 165. Transistors 160 and 165 are normally in a nonconductive state except when a sufficient voltage is applied to the base 204 or 206.

All of the electromagnets, induction coils and resistors in the discs are embedded during the molding of the discs which are made of a suitable plastic material. If the discs are made of a paramagnetic electrically conductive metal, the coils and connecting wires will be attached to the discs and will be insulated. It will be noted as clearly indicated in FIG. 15 that there are less electromagnets 169 in the inner ring thereof than in outermost ring of electromagnets 168, and there are still less electromagnets 170 in the innermost ring. In the drive discs the same number of electromagnets can be provided in each ring although here also the number of electromagnets in each ring can be different.

In the operation of system S10, when switches 154 and 202 are closed and motor 108 is running, the discs 100, 102 rotate and coils 146 becomes energized and by mutual induction a voltage is induced in each coil of the outer ring of coils 130 in both discs 100 and 102. The inner most ring of electromagnets 124 become magnetized and magnetically engage the cores 172 of the electromagnets 168 in the outer ring of electromagnets 168. This causes discs 110 and 112 to rotate at low speed but with high torque. The energized coil 197 induces voltages in the ring of coils 180 in each driven disc and the electromagnets 168 become magnetized to react with electromagnets 124 so that the load 118 continues to be driven at low speed and high torque.

If the speed of driven discs 110 and 112 increases due to increase in speed of discs 100, 102, the voltage induced in coils 180 by coil 197 will rise to the breakdown voltage of the Zener diode 192. The current flowing through coils 180 will now bypass the electromagnet coils 174 due to the relatively high resistance 188 and instead and current will flow via the Zener diode 192 to inner induction coils 182 and inner electromagnet coils 176. Coils 182 induce a voltage in stationary coil 198 which applies this voltage base 204 of transistor 160. The transistor becomes conductive and stationary coil 148 becomes energized. A voltage is then induced by coil 148 in the inner ring of induction coils 132 in the drive discs so that inner electromagnet coils 123 become energized. The inner electromagnets 122 than react with activated inner electromagnets 169 so that the driven discs rotate with the drive discs at lower torque but higher speed than before.

If the speed of the driven discs 110, 112 increases further due to further increase in speed of discs 100, 102, a still higher voltage will be induced in coils 180 and the Zener diode 196 will become conductive. The current which previously passes through coils 182 will bypass these coils due to the resistance of resistors 194. The current will now go through the innermost ring of coils 184 and the innermost electromagnet coils 178 of electromagnets 170. Coils 184 will induce a voltage in coil 199 which will be applied to base 206 of transistor 165. At the same time transistor 160 will become nonconductive to deenergize the inner ring of electromagnets 122 as coils 148 and 132 become deactivated. Transistor 165 becomes conductive and the inner coil 150 becomes energized. A voltage is induced in coils 134 which in turn induces a voltage in innermost coils 134. A current flows through coils 134 and outermost coils 144 of outermost electromagnets 120. These electromagnets intersect the innermost ring of electromagnets 170 in the drive discs which have become activated and react with electromagnets 120. Thus the driven discs will continue to rotate at a higher speed but with lower torque applied to shaft 114 and load 118. By inspection of the circuit diagrams it will be apparent that the process described is reversible, with lower speed and higher torque requirements of the load being met by automatic shifting of the reaction to electromagnets 122, 169 or to electromagnets 124, 168. The diodes provided in the several circuits, such as diodes 138, 142, 145, 186 and 189, prevent alternation of the currents and thus avoid production of eddy currents and hysteresis losses.

In FIG. 18 the system S11 is arranged like system S8 and corresponding parts are identically numbered. Magnetic coupling takes place between the two overlapping discs 74a and 80a with a thin nonmagnetic wall 99 separating the drive and driven members. This illustrates that it is possible to mechanically isolate the two members. The same principal is illustrated in FIGS. 2, 4, 5, 7, 8 and 9, where dotted lines L between the drive the drive and driven members represent thin nonmagnetic walls or sheets interposed to isolate the two members mechanically while permitting magnet coupling.

In FIG. 19 there is shown a magnetic transmission system S12 having variable automatic clutch. In this system drive rotor 300 is made of nonconductive plastic insulation material. It has electromagnets 303 and 304 spaced apart and extending diametrically of the cylindrical rotor, and a plurality of coils 305, 305a spaced circumferentially around the rotor and embedded therein. Coils 305 are spaced axially from coils 305a. Driven rotor 306 has a hollow cylindrical form and surrounds the rotor 300. Rotor 306 is also made of nonconductive plastic insulation material. Coils 301 and 301a extend circumferentially of the rotor 300 and are aligned with electromagnets 303 and 304. Coils 301 and 301a are connected in parallel with coils of electromagnets 302 and 302a. Coils 305 and 305a are connected in parallel with electromagnet 304. Diodes 307 and 307' in the circuits of the coils in both rotors are provided to insure unidirectional flow of current and thus to prevent hysteresis and heat losses. Motor 320 drives shaft 310 connected to rotor 300. A bearing 322 is provided for shaft 310. An axial shaft 309 is connected to rotor 306 and is journaled in bearing 324. Shaft 309 is coupled to load 326. A battery 330 is connected in series with a switch 308 to stationary wiper contacts 332, 334 which contact slip rings 336 and 338 carried on shaft 310. Ring 338 is supported on insulator 340, which may be an extension of rotor 300. Opposite ends of electromagnet coil 342 are connected to the slip rings.

In operation of system S12, when motor 320 is running and switch 308 is open, electromagnet 303 is not energized and no magnetic field exists so that no torque is transmitted between the rotors and driven shaft 309 does not rotate. With motor 320 still running, switch 308 is closed. This causes a current to flow through the slip rings 336, 338 and through coil windings 342 of electromagnet 303. This produces magnetic field which induces a voltage in coils 301. A current flows through the coils of electromagnets 302 and 302a, creating magnetic fields which induce voltages in coils 305 and 305a of drive rotor 300. A current flows from coils 305, 305a through coil 350 of electromagnet 304. Forces on conductors passing through magnetic fields between the rotors causes transmission of torque from shaft 310 through rotor 300 to rotor 306 which causes rotation of shaft 309 to drive load 326 when the resultant driving torque exceeds the reactive torque of the load.

When shaft 310 rotates slowly even though switch 308 is closed insufficient torque is produced to rotate driven shaft 309. As shaft 310 is turned faster, clutching is accomplished because sufficient torque is then generated between the rotors to turn shaft 309. Shaft 109 and rotor 306 must rotate more slowly, that is at a lesser number of revolutions per minute than rotor 300, for magnetic flux lines to be cut and for torque to be transmitted. Thus speed reduction is automatically accomplished. The diodes 307 and 307' prevent changes in current polarity and thus prevent hysteresis losses.

In all forms of the invention described, the systems can use permanent magnets or electromagnets. The drive disc and cylinders can be made of nonmagnetic metal such as brass, copper, aluminum or the like or of rigid plastic material.

While I have illustrated and described the preferred embodiments of my invention, it is to be understood that I do not limit myself to the precise construction herein disclosed and that various changes and modifications may be made within the scope of the invention as defined in the appended claims.

What is claimed is:

1. A magnetic transmission system, comprising a first rotatable member generally circular in form; a plurality of magnet means carried by said member in circumferentially spaced disposition; motor means for operatively connected to said first member for turning said first member on its axis; a second rotatable member generally circular in form; a plurality of other magnet means carried by said second member in circumferentially spaced disposition; shaft means connected to said second rotatable member for coupling the same to a rotatable load, said first and second members being disposed so that poles of the magnet means of the first member are successively coupled magnetically to and decoupled from poles of the other magnet means carried by the second member so that the load is driven by said motor means via to the two magnetically coupled members, said magnet means being coils of electro-magnets and diode rectifiers connected in circuit with the coils of the electromagnets to maintain magnetic polarity of the electromagnets and unidirectional flow of current through the coils, so that eddy currents and hysteresis losses are prevented in said members, the diodes of one of said rotatable members being in series with the connected coils and the stationary location of the flux generating coils being associated with the connected coils, said coils being so connected in circuit with each other in each of said members that torque application to the loaded member is changed automatically by proper changes in rotational speed of the first and second members in accordance with torque requirements of the load.

2. A magnetic transmission system as recited in claim 1, wherein said coils are connected in circuit with solid state components to change mechanical advantage between the rotating members in accordance with load requirements.

3. A magnetic transmission system as recited in claim 2, wherein the solid state components are transistors and diodes.

References Cited

UNITED STATES PATENTS

| 2,722,617 | 11/1955 | Cluwen et al. | 310—103 |
| 3,249,777 | 5/1966 | Congdon et al. | 310—104 |

FOREIGN PATENTS

| 592,048 | 4/1925 | France. |
| 606,867 | 3/1926 | France. |

DAVID X. SLINEY, Primary Examiner

U.S. Cl. X.R.

310—103